(No Model.)

E. L. REQUA.
TABLET FOR TEACHING PENMANSHIP.

No. 274,031. Patented Mar. 13, 1883.

WITNESSES
Wm A. Skinkle.
Edwin A. Newman.

INVENTOR,
Ella Lee Requa,
By her Attorneys
Baldwin, Hopkins & Peyton

UNITED STATES PATENT OFFICE.

ELLA LEE REQUA, OF NEW YORK, N. Y.

TABLET FOR TEACHING PENMANSHIP.

SPECIFICATION forming part of Letters Patent No. 274,031, dated March 13, 1883.

Application filed June 1, 1882. (No model.)

*To all whom it may concern:*

Be it known that I, ELLA LEE REQUA, a citizen of the United States, and a resident of the city, county, and State of New York, have invented certain new and useful Improvements in Writing Cards or Tablets, of which the following is a specification.

The object of my invention is to train the muscles of the hand and arm of the pupil so as to accustom them to the free-hand movements required in writing rapidly, easily, and legibly. This end I attain by means of a perforated card or tablet, the edges of which perforations constitute the contour or outline of the movement desired, and form guides or shoulders to direct the hand of the pupil and the instrument used for tracing the figure desired. By rapidly tracing these outlines the ease of motion necessary to produce legibility and rapidity of writing is readily acquired.

The subject-matter claimed is hereinafter specifically designated.

In its simplest form the card consists of a single perforated sheet, which may be placed over a slate or paper and the outlines marked on the card copied thereon. The card may then be removed, and the figures thus made on the slate or paper may serve as copies for free-hand exercise.

The pattern-card may be made of any desired thickness and of well-known materials, and is capable of long-continued service. The patterns may be readily cut out of the card by suitable stamps, and may be thus manufactured rapidly and with great economy.

Figure 2:
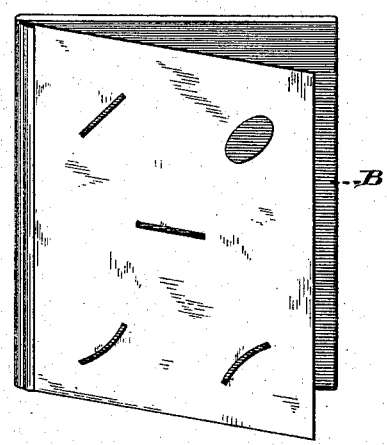
Figure 1:
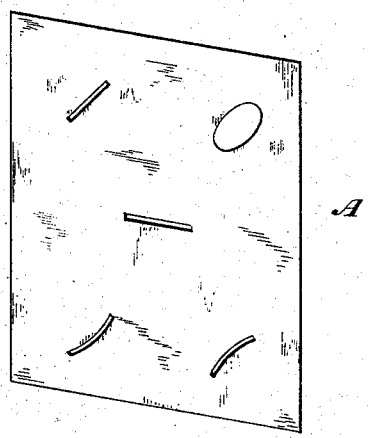

In the accompanying drawings, Figure 1 shows a single sheet, A, as perforated with figures of different outlines for teaching the different movements desired. Fig. 2 shows a single sheet with an additional sheet or flap, B, secured thereto at one edge, so that a sheet of paper may readily be interposed and clamped between them; or the sheet B may be written or marked upon, if desired. This sheet may have a composition or slate surface, if desired, so that the marks formed thereon can readily be erased.

I have shown the simple elementary forms of movements only, these constituting a part of a comprehensive system, the remaining cards of which need not differ in form, save in the different forms of the openings cut therein.

I do not broadly claim a perforated lettering-tablet, as it has heretofore been proposed to employ such a device as a guide for forming the lines and angles of letters by sliding it about in various positions, as this differs from my device, the object of which is not to form letters, but to constitute a guide for the pupil for training the muscles so as to acquire freedom of movement.

I claim as of my own invention—

The combination, substantially as hereinbefore set forth, of the perforated guide or pattern-sheet and the writing-tablet or flap secured thereto.

In testimony whereof I have hereunto subscribed my name this 29th day of May, 1882.

ELLA LEE REQUA.

Witnesses:
M. AUGUSTA REQUA,
GEO. F. VAIL.